United States Patent [19]

Suzuki

[11] Patent Number: 4,782,223

[45] Date of Patent: Nov. 1, 1988

[54] OPTICALLY BISTABLE PHOTODIODE DEVICE WITH VOLTAGE CONTROL CIRCUITRY TO CHANGE PHOTODIODE LIGHT ABSORPTION

[75] Inventor: Akira Suzuki, Tokyo, Japan

[73] Assignee: NEC Corporation, Tokyo, Japan

[21] Appl. No.: 98,811

[22] Filed: Sep. 21, 1987

[30] Foreign Application Priority Data

Sep. 19, 1986 [JP] Japan ................... 61-221528

[51] Int. Cl.$^4$ ............................. H01J 40/14
[52] U.S. Cl. ..................... 250/214 R; 250/213 A
[58] Field of Search ........... 250/205, 201, 206, 214 R, 250/551, 213 A

[56] References Cited

U.S. PATENT DOCUMENTS

| | | | |
|---|---|---|---|
| 3,952,265 | 4/1976 | Hunsperger | 250/551 |
| 4,565,924 | 1/1986 | Misumi et al. | 250/551 |
| 4,588,896 | 5/1986 | Abbas | 250/213 A |

OTHER PUBLICATIONS

Miller et al., "Novel Hybrid Optically Bistable Switch: The Quantum Well Self-Electro-Optic Effect Device," Appl. Phys. Lett. 45(1), Jul. 1984, pp. 13–15.

*Primary Examiner*—David C. Nelms
*Attorney, Agent, or Firm*—Sughrue, Mion, Zinn, Macpeak and Seas

[57] ABSTRACT

An improved optically bistable photodiode device comprises a photodiode in which the absorption of light is changed in accordance with a voltage to be applied thereacross, a circuit for amplifying photocurrent flowing through the photodiode, and a bias circuit for controlling the voltage to be applied across the photodiode wherein the incident light supplied to the photodiode is chosen to have a wavelength at which a resonance is produced in an exciton absorption or bandedge absorption where an electric field applied across a multiple quantum well is low so that a optically bistable operation is performed with a high speed response and low consuming power.

5 Claims, 2 Drawing Sheets

OPTICALLY BISTABLE PHOTODIODE DEVICE WITH VOLTAGE CONTROL CIRCUITRY TO CHANGE PHOTODIODE LIGHT ABSORPTION

FIELD OF THE INVENTION

The invention relates to an optically bistable photodiode device, and more particularly to an optically bistable photodiode device which is applicable to an optical information processing apparatus and so on.

BACKGROUND OF THE INVENTION

One of conventional optically bistable photodiode devices is described on pages 13 to 15 of "Applied Physics Letters" 45(1) published on July 1, 1984. The optically bistable photodiode device comprises a pin photodiode and a constant voltage supply from which a reverse biased voltage is applied through a series resistor across the pin photodiode. The pin photodiode includes a multiple quantum well inside an intrinsic region to which an electric field is applied perpendicularly under the reverse biased voltage.

In operation, a wavelength of the incident light is chosen to be near the exciton resonance position for zero voltage across the photodiode. When an optical power is low, the supply voltage is substantially applied across the photodiode because no voltage is dropped by the series resistor due to little photocurrent so that the exciton absorption is shifted to longer wavelengths. When the optical power is increased, the photocurrent is increased so that a voltage applied across the photodiode is decreased. This results in the increase of the exciton absorption due to the moving back of the exciton resonances whereby the photocurrent is further increased. As a result, an optically bistable switching operation is performed in the pin photodiode device.

Such an optically bistable photodiode device as described above has characteristics of two stable states and non-linear light transmission in regard to optical input and output. Therefore, the photodiode device is considered to be most important in optical arithmetic unit and memory for an optical information processing apparatus in the near future. For this reason, research and development have been and will be repeated on such a photodiode device in many organizations in the world.

A switching speed and power consumption are the most important characteristics for such a photodiode device, especially in an optical digital arithmetic processing apparatus which is one of applicable fields in view of such advantageous features of light as being fast in its velocity and used in parallel without interference. For instance, much attention has been paid to a consuming energy which is a multiplied value of a switching speed and consuming power as one of performances for an optically bistable photodiode devices, and research and development have been continued to reduce such a consuming energy.

In the optically bistable photodiode device as described before, however, a consuming energy is reported to be as high as 1nJ, in spite of the fact that the consuming energy is desired to be as low as 1pJ, even more 1fJ as a target value for a practical use of an optical digital arithmetic processing apparatus.

In this regard, there is a limitation in reducing a consuming energy for the reason why a bias resistor can not be low in its value beyond some extent for the principle of operation in the conventional optically bistable photodiode device, although a response speed can be fast in inversely proportional to a time constant based on the bias resistor and junction capacitance of the photodiode.

SUMMARY OF THE INVENTION

Accordingly, it is an object of the invention to provide an optically bistable photodiode device in which a high speed response can be obtained without deteriorating other characteristics.

It is a further object of the invention to provide an optically bistable photodiode device in which a power consumption is decreased.

According to the invention, an optically bistable photodiode device comprises, a photodiode in which the absorption of light is changed in accordance with a voltage to be applied thereacross, a circuit for detecting and amplifying photocurrent flowing through said photodiode, and a circuit for controlling said voltage to be applied across said photodiode in accordance with output of said circuit for detecting and amplifying.

BRIEF DESCRIPTION OF THE DRAWINGS

The invention will be explained in more detail in accordance with following drawings wherein.

DESCRIPTION OF THE PREFERRED EMBODIMENT

Figure 1:
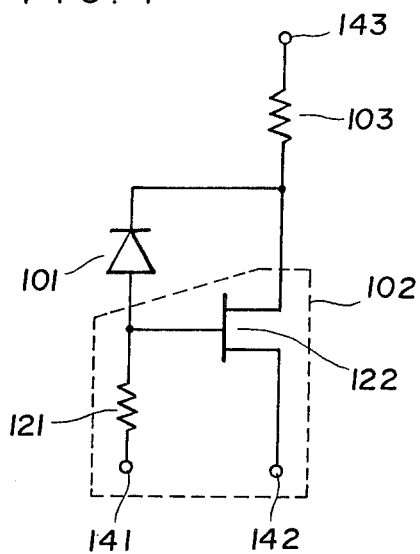
FIG. 1 is a circuit diagram showing an optically bistable photodiode device in the first embodiment according to the invention.

In FIG. 1, there is shown an optically bistable photodiode device in the first embodiment according to the invention. The optically bistable photodiode device comprises a photodiode 101, an amplifying circuit 102 including a resistor 121 and a transistor 122, and a bias resistor 103 wherein the p-electrode of the photodiode 101 is connected to a connecting point between the resistor 121 and gate electrode of the transistor 122, while the n-electrode thereof is connected to a connecting point between the bias resistor 103 and transistor 122. A voltage of $-1$ V is applied to a terminal 141 of the resistor 121, and a voltage of $+3$ V is applied to a terminal 143 of the bias resistor 103, while a terminal 142 of the transistor 122 is connected to the ground.

Figure 2:
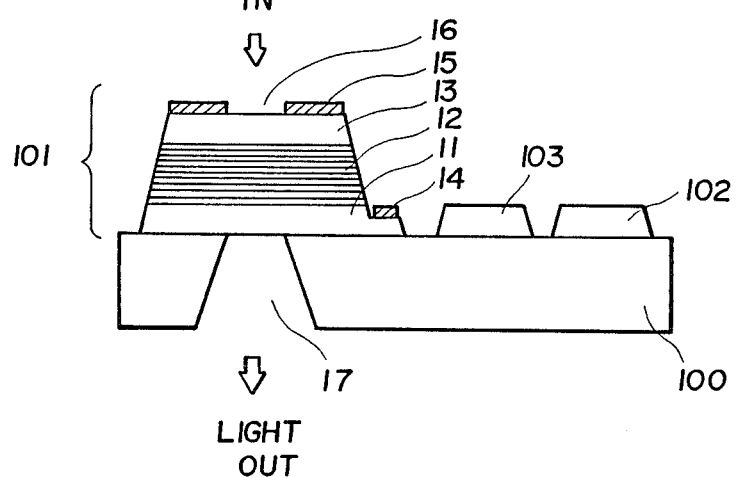
FIG. 2 is an explanatory view illustrating the optically bistable photodiode device in the first embodiment according to the invention.

In FIG. 2, there is shown the optically bistable photodiode device described in FIG. 1 which is fabricated to be integrated on a semi-insulating substrate 100 of GaAs in a monolithic manner. The photodiode 101 comprises an n-cladding layer 11 of n-$Al_{0.6}Ga_{0.4}As$ having a thickness of 1 $\mu$m, a multiple quantum well 12 including two hundred layers of undoped GaAs and $Al_{0.4}Ga_{0.6}As$ each having a thickness of 50 Å alternately formed on a surface of the n-cladding layer 11, a p-cladding layer 13 of p-$Al_{0.6}Ga_{0.4}As$ having a thickness of 1 $\mu$m formed on the opposite side of the n-cladding layer 11 in regard to the multiple quantum well 12, the n-electrode 14 provided on an extending portion of the n-cladding layer 11, and the p-electrode 15 having an incident light window 16 provided on the p-cladding layer 13. The n-cladding layer 11 is formed on a portion of the substrate 100 through which an light output aperture 17 is provided, and the amplifying circuit 102 and bias resistor 103 are also formed on the common surface of the substrate 100.

In the optically bistable photodiode device described above, the incident light is chosen to have a wavelength at which a resonance is produced under an exciton absorption where an electric field is low to be applied across the multiple quantum well 12. A diameter of the photodiode 101 is of 40 $\mu$m, and a junction capacitance thereof is of 0.2 pF. The resistor 121 is of 1 K$\Omega$ to detect photocurrent of the photodiode 101. The transistor 122 is of a low-noise MESFET in which an input gate capacitance is of 0.25 pF, and a mutual conductance is of 100 mS. The bias resistor 103 is of 2 K$\Omega$ to control a voltage to be applied across the photodiode 101 in accordance with a voltage drop in proportional to the photocurrent signal amplified in the amplifying circuit 102.

In the first embodiment according to the invention, an optically bistable operation is performed in accordance with an electric field effect of the exciton absorption in the multiple quantum well 12 of the photodiode 101 wherein photocurrent is amplified in the amplifying circuit 102 such that a voltage applied across the multiple quantum well 12 is fed back. In the optically bistable operation therein, a response speed and consuming power depend on the level of an electric field effect in the exciton absorption, and on a circuit parameter of the bias resistor 103. In other words, a voltage applied across the photodiode 101 must be changed by 2 V to result in an energy shift in the exciton absorption to be required in obtaining an optically bistable operation.

In the circuit of the first embodiment according to the invention, the whole input capacitance of the transistor 122 including a wiring stray capacitance of 50 fF is 0.5 pF so that CR time constant to be determined by the multiplied value of the capacitance of the transistor 122 and resistance of the resistor 121 is of 500 pS. Further, CR time constant to be determined by the bias resistor 103 and photodiode 101 is of 400 pS. On the other hand, a current gain is of 100 in the amplifying circuit 102 depending on the multiplied value of the resistance of the resistor 121 and mutual conductance of the transistor 122, and an output current to be required to result in the voltage variation of 2 V in the bias resistor 103 of 2 k$\Omega$ is of 1 mA in the amplifying circuit 102. Accordingly, the opticaly bistable switching operation is performed in a case where a light power of approximately 10 $\mu$W is supplied to the photodiode 101, if a quantum efficiency of the exciton absorption is 80% therein. Further, a switching speed of 1 nS is obtained, while a consuming energy is of 10 fJ which is one one-hundred thousandth as compared to that of the conventional optically bistable photodiode device.

Although the construction and operation of an optically bistable photodiode device in the first embodiment according to the invention was described in detail, general explanations will be made on operation of an optically bistable photodiode device of the invention as follows.

In a pin photodiode comprising a multiple quantum well composed of GaAs and AlGaAs layers, the incident light to be supplied thereto is chosen to be low in its intensity and to have a wavelength at which the exciton absorption is produced where an elecric field applied across the multiple quantum well is low. When a voltage to be changed in a bias circuit by an output of an amplifying circuit in which photocurrent flowing through the photodiode is detected to be amplified is applied across the photodiode, the absorption of light is low in the photodiode so that the intensity of light passing therethrough is high because the exciton absorption is shifted to longer wavelengths due to an electric field effect of the multiple quantum well. Next, when the incident light is increased in its intensity, photocurrent is increased in the photodiode thereby to result in the decrease of an electric field applied across the multiple quantum will due to a voltage drop at the bias circuit to which an output of the amplifying circuit is supplied. As a result, the shift of the exciton absorption is decreased to result in a further increase of photocurrent flowing through the photodiode so that an electric field applied across the multiple quantum well is sharply decreased to sharply increase a light absorption therein whereby a light passing through the photodiode to leave the back surface thereof is jumped down in its intensity from a high to low levels. Thus, an optically bistable characteristic is obtained between the incident light supplied to the photodiode and light leaving the photodiode.

In such optically bistable photodiode device, a response speed depends on a time constant to be determined by parameters of an amplifying circuit for detecting photocurrent to be amplified and of a bias circuit to be supplied with an output of the amplifying circuit. In a case where the amplifying circuit is composed of low-noise and high speed electronic device in which photocurrent is converted to low impedence, a bias circuit by which a voltage applied across the photodiode is changed can be of low impedence so that a resistance of the bias resistor which is a factor to restrain a response speed from being faster in a conventional optically bistable photodiode device can be remarkably lower thereby to result in a considerable decrease of a consuming energy.

Alternatively, an electric field effect of a band edge absorption may be adopted in place of the exciton absorption. Even in such a case, an optically bistable photodiode device of a low consuming energy is obtained in the exactly same principle as that of the exciton absorption except that the polarity of an output signal from the amplifying circuit is reversed.

Figure 3:
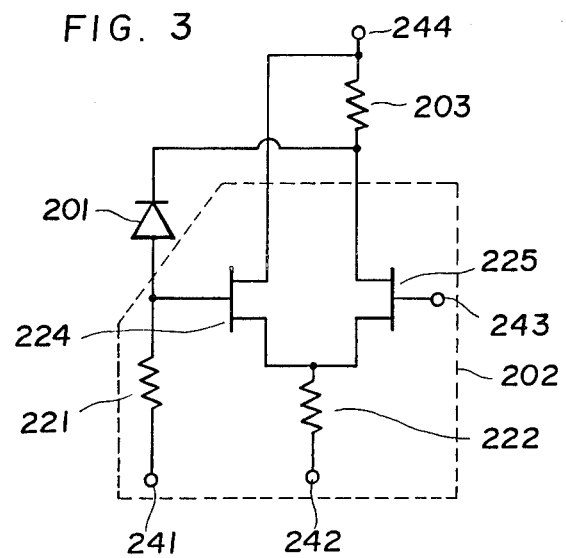
FIG. 3 is a circuit diagram showing an optically bistable photodiode device in the second embodiment according to the invention.

In FIG. 3, there is shown an optically bistable photodiode device in the second embodiment according to the invention. The optically bistable photodiode device comprises a photodiode 201, an amplifying circuit 202 including resistors 221 and 222 and transistors 224 and 225, and a bias resistor 203 wherein the p-electrode of the photodiode 201 is connected to a connecting point between the resistor 221 and gate electrode of the transistor 224, while the n-electrode thereof is connected to a connecting point between the bias resistor 203 and the collector of the transistor 225. A voltage of $-1.01$ V is applied to a terminal 241 of the resistor 221, a voltage of $-1$ V is applied to a terminal 243 of the transistor 225, and a voltage of $+3$ V is applied to a common terminal 244 of the bias resistor 203 and collector of the transistor 224, while a terminal 242 of the resistor 222 connected to the emitters of the transistors 224 and 225 is connected to the ground.

Figure 4:
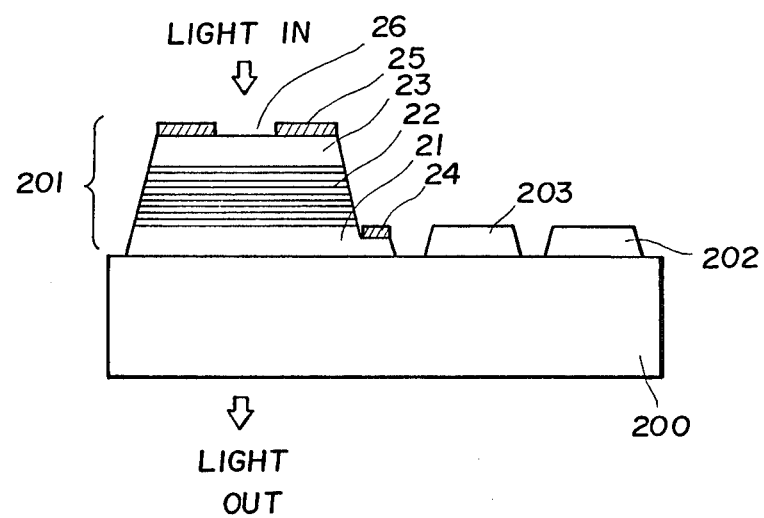
FIG. 4 is an explanatory view illustrating the optically bistable photodiode device in the second embodiment according to the invention.

In FIG. 4, there is shown the optically bistable photodiode device described in FIG. 3 which is fabricated to be integrated on a semi-insulating substrate 200 of InP in a monolithic manner. The photodiode 201 comprises an n-cladding layer 21 of n-InP having a thickness of 1 μm, a multiple quantum well 22 including two hundred layers of undoped InAlAs and InGaAs each having a thickness of 50 Å alternately formed on a surface of the n-cladding 21, a p-cladding layer 23 of p-InP having a thickness of 1 μm formed on the opposite side of the n-cladding layer 21 in regard to the multiple quantum well 22, the n-electrode 24 provided on an extending portion of the n-cladding layer 21, and the p-electrode 25 having an incident light window 26 provided on the p-cladding layer 23. The n-cladding layer 21 is formed on a portion of the substrate 200 through which light is transmitted to be left the mirror-like polished bottom surface, and the amplifying circuit 202 and bias resistor 203 are also formed on the common surface of the substrate 200.

In the optically bistable photodiode device described above, the incident light is chosen to have a wavelength at which a resonance is produced in accordance with a band edge absorption where an electric field applied across the multiple quantum well 22 is low. A diameter of the photodiode 201 is of 40 μm, and a junction capacitance thereof is of 0.2 pF. The resistor 221 is of 1 kΩ to detect photocurrent of the photodiode 201, while the resistor 222 is of 100 Ω to be connected to the emitters of the transistors 224 and 225, and the bias resistor 203 is of 2 kΩ. The transistors 224 and 225 are of a low-noise electric field transistor of InGaAs in which an input capacitance is of 0.25 pF, and a mutual conductance is of 100 mS.

In the second embodiment according to the invention, an optically bistable operation is performed in accordance with an electric field effect of a band edge absorption in the multiple quantum well 22 wherein photocurrent is amplified in the amplifying circuit 202 such that a voltage applied across the multiple quantum well 22 is fed back to be changed in a direction in which the absorption of light becomes larger in the photodiode 201. The explanations are omitted to be repeated here because operation is the same as the first embodiment except that a signal to be fed back in accordance with the photocurrent in the photodiode 201 is reversed in its polarity for the reason why an electric field effect of a band edge absorption is utilized in the multiple quantum well 22 in place of an exciton absorption. Therefore, a switching speed and consuming power are also remarkably improved in an optically bistable photodiode device in the second embodiment according to the invention as compared to a conventional optically bistable photodiode device for the same reason as in the first embodiment.

Although parameters are specified in the first and second embodiments, values thereof may be changed, if photocurrent is detected to be amplified, and a bias voltage is applied across a photodiode. Even in a fabrication of a photodiode, such a structure as super lattice, super thin film, bulk and so on may be adopted. Further, an incident light may be chosen to have an optimum wavelength at which an optically bistable operation is performed. Still further, such a material as composite material of GaAs and InP systems, GaSb system and so on in addition to GaAs system and InP system in the first and second embodiments may be selected.

Although the invention has been described with respect to specific embodiment for complete and clear disclosure, the appended claims are not to thus limited but are to be construed as embodying all modification and alternative constructions that may occur to one skilled in the art which fairly fall within the basic teaching herein set forth.

What is claimed is:

1. An optically bistable photodiode device comprising,
   a photodiode in which the absorption of light is changed in accordance with a voltage to be applied thereacross,
   a circuit for detecting and amplifying photocurrent flowing through said photodiode, and
   a circuit for controlling said voltage to be applied across said photodiode in accordance with output of said circuit for detecting and amplifying.

2. An optically bistable photodiode device according to claim 1,
   further comprising a common substrate on which said photodiode, said circuit for detecting and amplifying, and said circuit for controlling are provided.

3. An optically bistable photodiode device according to claim 1,
   wherein said photodiode includes a multiple quantum well, and p and n-cladding layers provided on the respective surfaces of said multiple quantum well.

4. An optically bistable photodiode device according to claim 2,
   wherein said common substrate is of a semi-insulating substrate of GaAs, and said circuit for detecting and amplifying includes a resistor and a transistor, said resistor being connected to the p-electrode of said photodiode and gate electrode of said transistor, said transistor being connected at its collector to said circuit for controlling, and said circuit for controlling being connected to the n-electrode of said photodiode.

5. An optically bistable photodiode device according to claim 2,
   wherein said common substrate is of a semi-insulating substrate of InP, and said circuit for detecting and amplifying includes a resistor and a pair of transistors, said resistor being connected to the p-electrode of said photodiode and gate electrode of one of said transistors, another of said transistor being connected at its emitter to the emitter of said one of said transistors and being connected at its collector to said circuit for controlling, and said circuit for controlling being connected to the n-electrode of said photodiode.

* * * * *